Feb. 7, 1950        C. C. MILES        2,496,884

METHOD OF MAKING PICTURE FRAMES

Filed May 9, 1947

INVENTOR.
Carroll C. Miles
BY Charles R. Fay,
atty.

Patented Feb. 7, 1950

2,496,884

UNITED STATES PATENT OFFICE 2,496,884

METHOD OF MAKING PICTURE FRAMES

Carroll C. Miles, Leominster, Mass.

Application May 9, 1947, Serial No. 747,054

4 Claims. (Cl. 154—125)

This invention relates to picture frames and the like and the principal object of the invention includes the provision of a new and improved method of making picture frames having slip-back constructions for quick and easy insertion and removability of the glass and the picture without the use of any fasteners, the invention residing particularly in the method of forming the back of the frame by securing two rectangular plain sheets together and dieing out a rectangular or U-shaped conformation through one sheet only, then applying the double sheet to the back of a front frame with the cut out portion still in place and the died out surface applied to the front frame, exposing the uncut sheet, then dieing out the uncut sheet of the back element in a similar conformation in such a way as to provide a sliding back which may be slid out of the completed frame only after the final dieing out operation, thus completing the entire frame in two cutting operations and leaving U-shaped rims serving as guide edges and overlapping slide guides for the sliding back.

Other objects and advantages of the invention will appear hereinafter.

Reference is to be had to the accompanying drawings, in which

Figure 1:
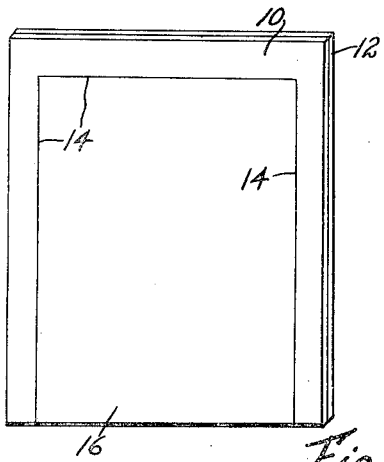
Fig. 1 is a perspective view of the back frame died out on one side only and illustrating the first step in the process.

As shown in Fig. 1 two sheets of material of any kind but preferably chip board or the like are glued together in face to face relation and are illustrated at 10 and 12. These sheets form the back element of the frame and are of any shape desired according to the frame wanted but are perfectly plain and unmarked in any way, and are glued at certain points only as will appear hereinafter.

Sheet 10 is then died out along a U-shaped line 14 forming a piece 16 which, however, is not removed so that the back element of the frame as shown in Fig. 1 still remains two plain sheets of material glued together but having a cut out line 14 extending through one sheet only leaving sheet 12 completely uncut and undisturbed, but forming a U-shaped rim in sheet 10.

Figure 2:
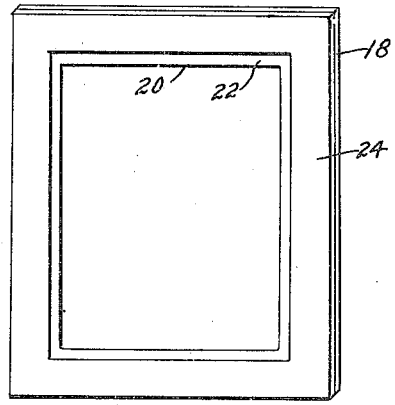
Fig. 2 is a perspective view of the front frame from the rear surface thereof.

Fig. 2 illustrates the front frame which comprises a front sheet 18 forming the front of the frame, this sheet being centrally cut out as shown at 20 and forming a ledge or shoulder 22 extending inwardly of a cut out intermediate frame member 24. The Fig. 2 representation shows the back of the front frame and the ledge 22 serves to receive the glass and the picture as in a well.

The back element of Fig. 1 is then glued to member 24 with sheet 10 contacting and secured to member 24, but the only part of sheet 10 that is adhesively secured thereto is the U-shaped rim element shown in Fig. 1, the part 16 not being glued to anything.

As thus far described the construction comprises four sheets or plies 18, 24, 10 and 12, now all glued together and being completed and unmarked except that sheet 10 has a cut out part 16 which cannot be removed by sliding out at an edge of the frame only because it is adhesively secured to sheet 12 which in turn is secured to sheet 10 at certain points only, and sheet 10 is in turn adhered to member 24 at its edges.

Figure 3:
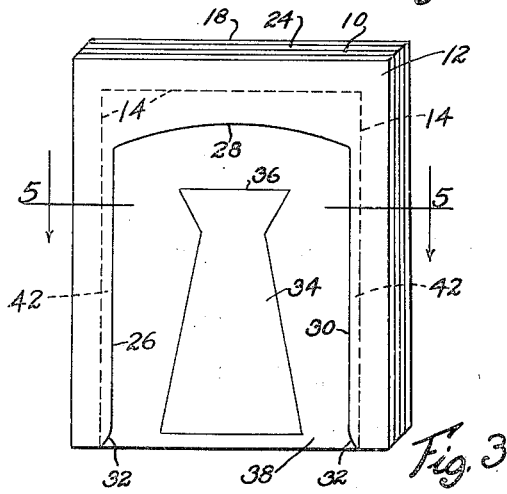
Fig. 3 is a perspective view of the completed frame from the rear and showing the last step in the process.
Figure 4:
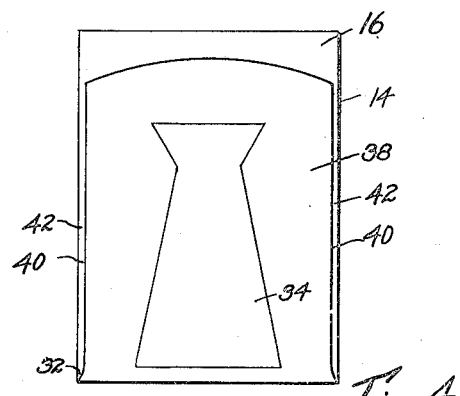
Fig. 4 is a view in elevation of the sliding back when removed from the frame.

The final operation is now ready to be performed and this consists in dieing out sheet 12, see Fig. 3, along a continuous line 26, 28, 30, the died out lines 26 and 30 extending at an angle as at 32 to merge with cut out lines 14 at the extreme bottom edge of the frame.

An easel 34 may also be cut out at the same time, it being understood that this easel is still secured along line 36 to the cut out portion 38 of sheet 12 and it is to be understood that sheet 12 was originally adhesively secured to sheet 10 only in the area defined by the element 38 excluding the area of the easel 34.

The back of the frame may now be slid out from the frame inasmuch as the cut lines 26 and 30 in sheet 12 merge with the cut lines 14 in sheet 10 and the elements 16 and 38 are completely separated from sheet 10, and are secured together, and it is apparent that the glueing between sheets 10 and 12 within the rectangle having edges 14, was omitted between line 14 and lines 26, 28, 30.

This construction provides a sliding back comprising the element 38, easel 34, and part 16 adhesively secured thereto, part 16 having side edges 14 extending beyond the side edges 40 of sheet 38 forming guide shoulders 42 which are slidably guided by the remainder of sheet 12 in combination with the remainder of sheet 10 as outlined by the removal of part 16 and it will be clear from an inspection of Fig. 3 that the shoulders 42 underlie the inner edges of the U-shaped frame formed from sheet 12 and the side edges 14 slidingly contact the side edges of the U-shaped frame of sheet 10 remaining when part 16 has been cut out.

Figure 5:
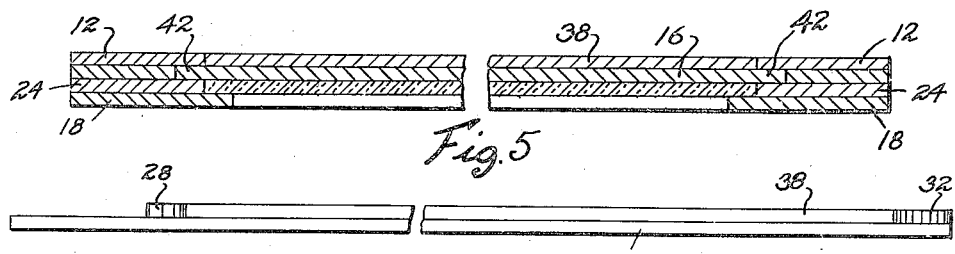
Fig. 5 is an enlarged section on line 5—5 of Fig. 3.
Figure 6:
Fig. 6 is an enlarged edge view of the back shown in Fig. 4.

To make the above clearer, the construction is shown in section in Fig. 5 wherein it will be appreciated that the side edges of the part 16 indicated as the shoulders 42 underlie the U-shaped part of sheet 12 and since all of the cutting operations were done by dieing, the parts will fit with exceptional accuracy there having been no material removed in any of the operations.

The line 38 is seen to be curved and this forms a curve locating the slip-back at the inner end and providing an easy entering guide and obviating any "bumping" or canting as the frame is closed. Attention is directed to my copending application Serial No. 592,301, filed May 7, 1945, directed to similar subject matter.

Having thus described my invention and the advantages thereof, I do not wish to be limited to the details herein disclosed otherwise than as set forth in the claims but what I claim is:

1. Method of making a frame comprising the steps of securing two sheets of material together, cutting through a portion of one sheet only along a line of general U-shape, securing the sheets to an open front frame along the U, and then cutting the other sheet along a line of general U-shape forming a smaller U within the area of the first named U, the areas between U's having been left unsecured.

2. Method of making a frame comprising the steps of adhesively securing two sheets of relatively stiff material in superposed alined condition, but leaving a U-shaped figure non-adhered, cutting a U-shaped rim in the surface of one sheet about the U-shaped figure without removing the cut portion, adhesively securing the rim to the sides and top of an open frame with the uncut sheet exposed, and cutting a wider U-shaped rim in the heretofore uncut sheet.

3. The method of claim 2 wherein the last step includes joining the two cuts at an edge of the frame.

4. A method of making a frame comprising the steps of forming a two ply sheet by cementing at certain areas only, cutting a U-shaped rim in one ply only so that the open end of the rim coincides with an edge of the sheet securing the sheet by its cut surface to an open coextensive frame leaving the uncut ply wholly exposed, cutting a substantially symmetrical U-shaped rim in the exposed ply, and joining the lines of cut in both plies at the said sheet edge.

CARROLL C. MILES.

REFERENCES CITED

The following references are of record in the file of this patent:

UNITED STATES PATENTS

| Number | Name | Date |
| --- | --- | --- |
| 275,316 | Wright | Apr. 3, 1883 |
| 2,304,787 | Avery | Dec. 15, 1942 |